United States Patent
Down et al.

(10) Patent No.: US 11,905,827 B2
(45) Date of Patent: Feb. 20, 2024

(54) REMOTE DIGITIZATION OF ELECTROMAGNETIC TELEMETRY SIGNAL

(71) Applicant: HighSide Carbide Canada Ltd., Calgary (CA)

(72) Inventors: Alexander Down, Calgary (CA); Ryan McPhee, Calgary (CA)

(73) Assignee: HighSide Carbide Canada Ltd., Calgary (CA)

( * ) Notice: Subject to any disclaimer, the term of this patent is extended or adjusted under 35 U.S.C. 154(b) by 321 days.

(21) Appl. No.: 17/333,952

(22) Filed: May 28, 2021

(65) Prior Publication Data
US 2022/0381142 A1    Dec. 1, 2022

(51) Int. Cl.
| | |
|---|---|
| G01V 3/00 | (2006.01) |
| E21B 47/13 | (2012.01) |
| G01V 3/26 | (2006.01) |
| G01V 3/34 | (2006.01) |
| H04L 67/12 | (2022.01) |
| H04B 1/00 | (2006.01) |
| H04W 56/00 | (2009.01) |
| H04W 4/20 | (2018.01) |
| G01S 19/14 | (2010.01) |

(52) U.S. Cl.
CPC ............. *E21B 47/13* (2020.05); *G01S 19/14* (2013.01); *G01V 3/26* (2013.01); *G01V 3/34* (2013.01); *H04B 1/0003* (2013.01); *H04L 67/12* (2013.01); *H04W 4/20* (2013.01); *H04W 56/001* (2013.01)

(58) Field of Classification Search
CPC ........... E21B 47/13; G01S 19/14; G01V 3/34; H04B 1/0003; H04L 67/12; H04W 4/20; H04W 56/001
USPC ........................................................ 340/853.1
See application file for complete search history.

(56) References Cited

U.S. PATENT DOCUMENTS

| | | | |
|---|---|---|---|
| 9,881,506 B1 * | 1/2018 | Gentry | H04W 76/10 |
| 10,378,337 B2 | 8/2019 | DePavia et al. | |
| 2003/0080962 A1 * | 5/2003 | Erickson | G06T 11/206 |
| | | | 345/440 |
| 2016/0010446 A1 * | 1/2016 | Logan | E21B 33/06 |
| | | | 340/854.4 |
| 2018/0187544 A1 * | 7/2018 | Down | E21B 44/005 |
| 2019/0345818 A1 | 11/2019 | DePavia et al. | |
| 2019/0369283 A1 * | 12/2019 | Hanson | G01V 3/081 |
| 2021/0164344 A1 * | 6/2021 | Wilson | E21B 47/13 |
| 2022/0085482 A1 * | 3/2022 | White | H01Q 1/04 |

* cited by examiner

*Primary Examiner* — Naomi J Small

(57) ABSTRACT

A digitizing apparatus for transmitting electromagnetic telemetry signals to facilitate drilling operations comprises a local receiver and one or more remote transmitters. A method uses the remote transmitter to measure an electric potential between a pair of ground stakes that are positioned at some distance away from the local receiver. The local receiver is coupled to a surface receiver that is located at or near a drilling rig. The remote transmitter converts the electric potential into a digital signal and transmits the digital signal wirelessly to the local receiver. The local receiver then converts the digital signal into an analog signal that is provided to the surface receiver for processing. The remote transmitter and local receiver may comprise GPS clocks to synchronize the signals to maintain a constant phase shift.

5 Claims, 4 Drawing Sheets

REMOTE DIGITIZATION OF ELECTROMAGNETIC TELEMETRY SIGNAL

CROSS-REFERENCE TO RELATED APPLICATIONS

N/A

FIELD

The present disclosure relates to technologies in wellbore drilling operations and more particularly to systems, apparatus, and methods for transmitting electromagnetic telemetry signals to facilitate drilling operations.

BACKGROUND

Drilling for hydrocarbons in subterranean formations requires precise wellbore location, which often requires the wellbore to follow a complex non-linear path for maximum resource recovery. This has been the focus of measurement while drilling (MWD) technology for several decades. The goal of all MWD systems is to deliver measurements taken near the drill bit to the operators on the surface to allow them to make inform decisions as to well path, drill bit heading, formation properties, downhole tool condition, and anything else deemed important for efficient drilling. The more information that can be delivered to the operators the better the drilling operation can be optimized. One branch of the MWD industry seeks to create and improve the downhole sensors, the other branch seeks to maximize the bandwidth and reliability of the communication channel between those downhole sensors and the operators at surface.

Several general technology modalities exist to convey information from downhole sensors to surface, one of which employs a downhole transmitter that encodes binary information from the downhole sensor into a modulated sinusoidal signal, then drives current representing that signal into the formation. The downhole sensor and the corresponding downhole transmitter are typically located in the bottomhole assembly of the drill string, for example, at the drill bit. The resulting electromagnetic (EM) field propagates through the earth in all directions. The component of the field that reaches the surface can be detected by measuring the electric potential between two points on surface. A signal based on the measured electric potential at surface is filtered and processed to recover the best possible estimate of the original signal generated by the downhole transmitter.

With reference to FIG. 1, the above-described technology operates with a surface receiver 22 located in a structure on the wellsite for drilling a wellbore 32, which is typically at or near the drilling rig 30 of the wellbore 32. The surface receiver 22 is networked to other rig equipment like the electronic data recorder (EDR) and various remote displays for the operators' viewing. The surface receiver 22 houses a sensitive analog-to-digital converter coupled to cables 26 that run from the surface receiver 22 out into the surrounding area on surface E and the cables 26 are terminated with copper ground stakes 24 driven into the earth. The surface receiver 22 is configured to detect the electric potential between the ground stakes 24 and based on the electric potential, derive an estimate of the original signal from the downhole transmitter 34. The exact placement strategy of the ground stakes 24 is a learned art and can vary from positions proximal to the drilling rig 30, to positions far away from the surface receiver 22. The distance between the ground stakes 24 and the surface receiver 22 is denoted by the reference character "D" and the distance D may range from several feet to several thousand feet.

Recovery of the original signal by the surface receiver 22 can be inhibited by any uncorrelated electrical noise superimposed on the downhole originated signal. Sources of electrical noise are primarily from high power electrical equipment, including for example some typical equipment at or near the drilling rig. As these equipment all rely on an earth-ground electrical system, the return current always flows through the ground. The return current propagates in all directions and is modulated by the mechanical process using electrical power. For example, the top drive of a drilling rig is a massive electric motor ranging in power from 500-1500 hp. The current consumed by the top drive is directly proportional to the torque output. When drilling ahead and rotating at a constant RPM the changing, unpredictable reactionary torque of the drill string results in a fluctuating torque demand on the motor. These torque fluctuations are "encoded" in the current draw and this current returns through the earth ground to the local generator. The torque fluctuations are in a similar bandwidth to the frequency used to encode downhole sensor data so they cannot be easily filtered out. To address this issue, MWD operators attempt to position the ground stakes 24 as far from sources of electrical noise as possible. However, because the ground stakes 24 are connected by continuous cables 26 to the surface receiver 22, placement of the ground stakes is restricted by the maximum available length of the cables, the required effort to drag thousands of feet of cables out to reach the desired location, and interception by busy roads, private properties, and impassible terrains. Consequently, the placement of the ground stakes 24 is usually a compromise between the above limiting factors and the received signal quality.

Accordingly, the present disclosure aims to address the abovementioned shortcomings of the existing EM signal recovery technology.

SUMMARY

According to a broad aspect of the present disclosure, there is provided a method comprising: measuring, by a remote transmitter, an electric potential between a pair of ground stakes positioned at a distance from a local receiver located at or near a drilling rig, the electric potential providing a first analog signal; converting, by the remote transmitter, the first analog signal into a digital signal that represents the electric potential; transmitting, by the remote transmitter, the digital signal wirelessly to the local receiver; and converting, by the local receiver, the digital signal into a second analog signal.

In some embodiments, the method comprises transmitting, by the local receiver, the second analog signal to a surface receiver located at or near the drilling rig.

In some embodiments, transmitting the digital signal wirelessly comprises transmitting the digital signal by one or more of: radio transmission, cellular transmission, and satellite transmission.

In some embodiments, the distance ranges from 50 meters to 6000 meters.

In some embodiments, the method comprises synchronizing, by the remote transmitter and the local receiver, the first and second analog signals to maintain a constant phase shift between the first and second analog signals.

In some embodiments, synchronizing comprises: GPS time-stamping, by the remote transmitter, the digital signal to provide a time-stamped digital signal; converting, by the local receiver, the time-stamped digital signal into the second analog signal; and transmitting, by the local receiver, the second analog signal in a timing consistent with the time-stamped digital signal according to a GPS clock in the local receiver to a surface receiver located at or near the drilling rig.

According to another broad aspect of the present disclosure, there is provided a method comprising: installing a plurality of pairs of ground stakes in the earth, with each pair of the plurality of pairs of ground stakes at a respective distance from a local receiver located at or near a drilling rig; measuring, by a first remote transmitter, an electric potential between a first pair of the plurality of pairs of ground stakes, the electric potential between the first pair providing a first analog signal; converting, by the first remote transmitter, the first analog signal into a first digital signal that represents the electric potential between the first pair, the first digital signal having a first signal strength; measuring, by a second remote transmitter, an electric potential between a second pair of the plurality of pairs of ground stakes, the second pair being spaced apart from the first pair, the electric potential between the second pair providing a second analog signal; converting, by the second remote transmitter, the second analog signal into a second digital signal that represents the electric potential between the second pair, the second digital signal having a second signal strength; and one of:
  a. comparing, by the first and second remote transmitters, the first and second signal strengths to determine which of the first and second signal strengths is greater; and if the first signal strength is greater, transmitting, by the first remote transmitter, the first digital signal wirelessly to the local receiver; or if the second signal strength is greater, transmitting, by the second remote transmitter, the second digital signal wirelessly to the local receiver; and
  b. transmitting, by the first and second remote transmitters, the first and second digital signals wirelessly to the local receiver; and comparing, by the local receiver, the first and second signal strengths to determine which of the first and second signal strengths is greater.

In some embodiments, the comparing is performed by the first and second remote transmitters, and the method comprises converting, by the local receiver, the first or second digital signal into a third analog signal.

In some embodiments, the comparing is performed by the local receiver, and the method comprises: if the first signal strength is greater, converting, by the local receiver, the first digital signal into a third analog signal; or if the second signal strength is greater, converting, by the local receiver, the second digital signal into the third analog signal.

In some embodiments, the method comprises transmitting, by the local receiver, the third analog signal to a surface receiver located at or near the drilling rig.

In some embodiments, the respective distance ranges from 50 meters to 6000 meters.

In some embodiments, installing the plurality of pairs of ground stakes comprises positioning at least one pair of the plurality of pairs of ground stakes along a planned well path of a wellbore.

According to another broad aspect of the present disclosure, there is provided a digitizing apparatus for use with a surface receiver located at or near a drilling rig and a pair of ground stakes installed in the earth at a distance from the surface receiver, the pair of ground stakes having an electric potential therebetween, the digitizing apparatus comprises: a remote transmitter configured to be coupled to the pair of ground stakes to measure the electric potential and to generate a digital signal based on the electric potential; and a local receiver configured to convert the digital signal into an analog signal representing the electric potential and to be coupled to the surface receiver to transmit the analog signal to the surface receiver, wherein the remote transmitter is configured to transmit the digital signal to the local receiver by wireless transmission.

In some embodiments, the remote transmitter comprises an analog-to-digital converter for converting the electric potential into the digital signal, and the local receiver comprises a digital-to-analog converter for converting the digital signal into the analog signal.

In some embodiments, the remote transmitter comprises a remote radio transceiver for transmitting the digital signal via radio transmission, and the local receiver comprises a local radio transceiver for receiving the digital signal via radio transmission.

In some embodiments, the remote transmitter comprises a battery.

In some embodiments, the remote transmitter comprises a solar panel for charging the battery.

In some embodiments, the remote transmitter is configured to be portable.

In some embodiments, the remote transmitter comprises a ruggedized enclosure for housing one or more components of the remote transmitter.

In some embodiments, the local receiver comprises a pair of differential analog outputs and the local receiver is configured to be coupled to the surface receiver by a first set of cables via the pair of differential analog outputs; and the remote transmitter is configured to be coupled to the pair of ground stakes by a second set of cables.

In some embodiments, the local receiver and remote transmitter each comprise a respective GPS clock.

The details of one or more embodiments are set forth in the description below. Other features and advantages will be apparent from the specification and the claims.

BRIEF DESCRIPTION OF THE DRAWINGS

The invention will now be described by way of an exemplary embodiment with reference to the accompanying simplified, diagrammatic, not-to-scale drawings. Any dimensions provided in the drawings are provided only for illustrative purposes, and do not limit the invention as defined by the claims. In the drawings:

In FIG. 4, the remote transmitter is shown with ground stakes.

In FIG. 5, the local receiver is shown with a surface receiver.

DETAILED DESCRIPTION OF THE EMBODIMENTS

When describing the present invention, all terms not defined herein have their common art-recognized meanings.

To the extent that the following description is of a specific embodiment or a particular use of the invention, it is intended to be illustrative only, and not limiting of the claimed invention. The following description is intended to cover all alternatives, modifications and equivalents that are included in the scope of the invention, as defined in the appended claims.

According to embodiments herein, a system is configured to allow more freedom in the placement of ground stakes. In general, the system comprises two modules: a remote digitizing transmitter and a local synthesis receiver. The digitizing transmitter is placed near the ground stakes and is coupled to the ground stakes by cables. The synthesis receiver is placed at or near the drilling rig and is coupled to a conventional surface receiver. The digitizing transmitter and the synthesis receiver are configured to communicate with each other wirelessly, thus collectively replacing the lengthy cables that connect the surface receiver and the ground stakes in the prior art system. The system of the present disclosure and related methods are described hereinbelow in greater detail.

Figure 1:
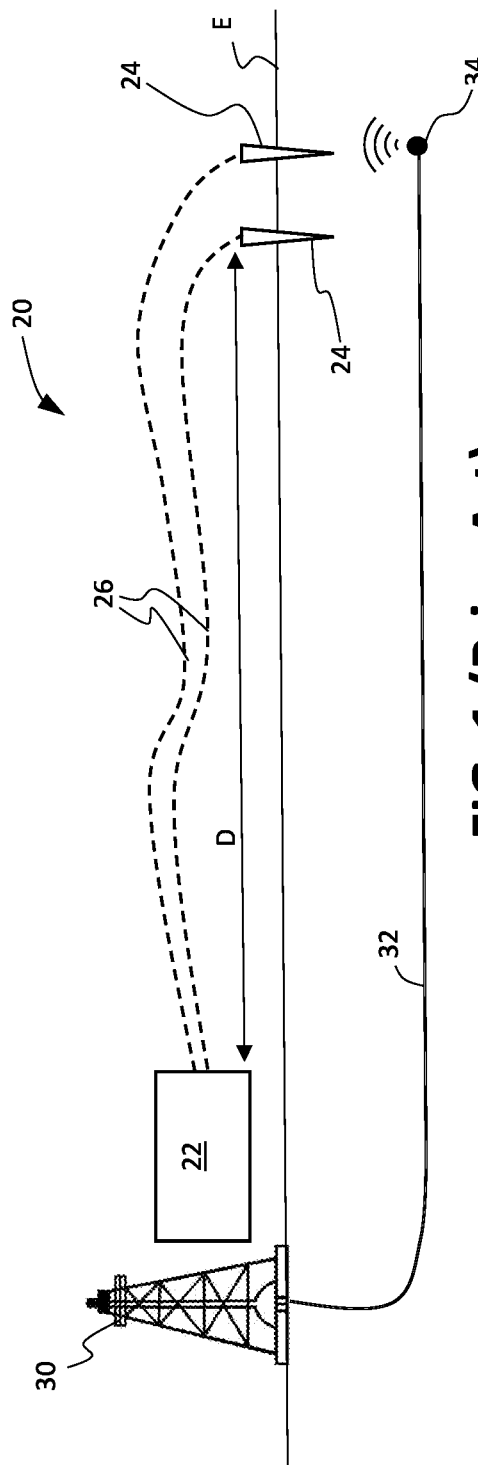
FIG. 1 is a schematic view of a prior art system for recovering EM signals from a downhole transmitter.
Figure 2:
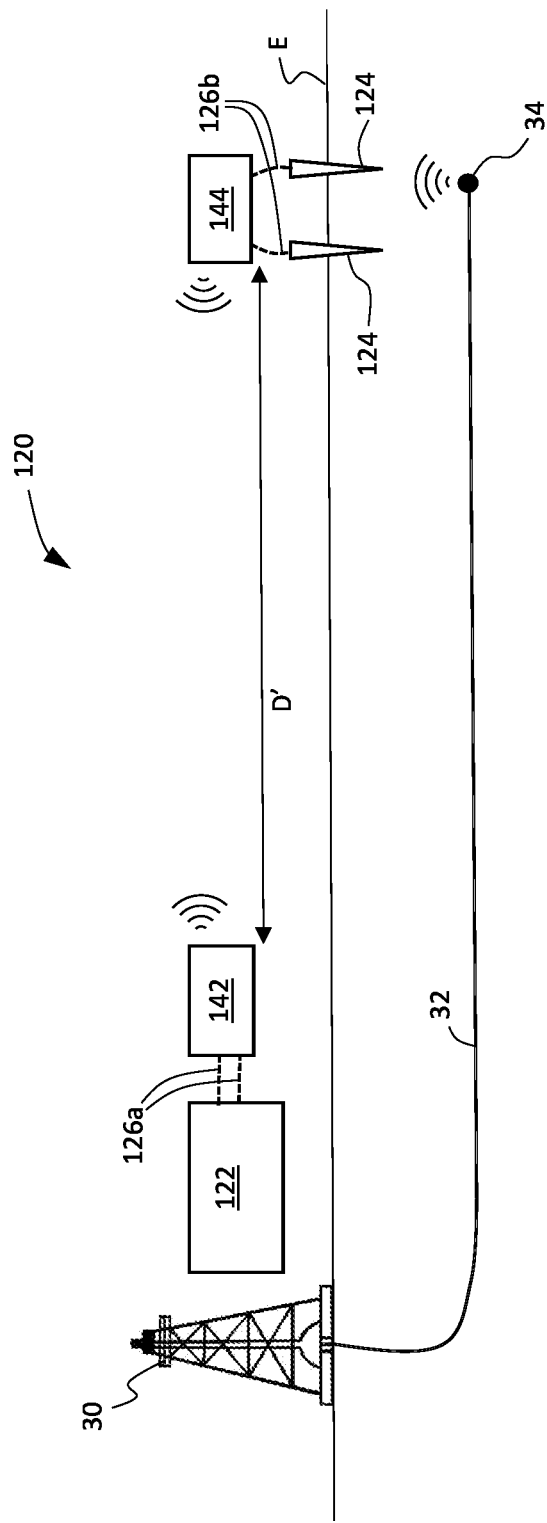
FIG. 2 is a schematic view of a system comprising a digitizing apparatus for recovering EM signals from the downhole transmitter, according to one embodiment.

With reference to FIG. 2, a system 120 according to one embodiment of the present disclosure has a digitizing apparatus comprising two modules: a local synthesis receiver 142 and a remote digitizing transmitter 144. The local synthesis receiver 142 is operably coupled to and in communication with a surface receiver 122. The local receiver 142 may be coupled to the surface receiver 122 wiredly (for example, via cables 126a) or wirelessly. Cables 126a may be conventional cables 26 like those used in prior art system 20. In some embodiments, the local receiver 142 may be located at or near the drilling rig 30, along with the surface receiver 122. In some embodiments, the surface receiver 122 is the same as or similar to the surface receiver 22 of the prior art system 20 in FIG. 1.

The remote transmitter 144 is operably coupled to and in communication with ground stakes 124. The remote transmitter 144 may be wiredly coupled to the ground stakes 124 via cables 126b. In some embodiments, the ground stakes 124 are the same as or similar to the copper ground stakes 24 of the prior art system 20 in FIG. 1. In other embodiments, the ground stakes 124 may be any earthed metallic structure, such as an existing well(s), situated near the downhole transmitter 34. In some embodiments, the ground stakes 124 are spaced apart by about 10 meters to about 50 meters. The remote transmitter 144 may have connections like those of the prior art surface receiver 22 of system 20 in FIG. 1 for connecting with cables 126b. For example, the remote transmitter 144 may have two ports for connecting a pair of cables 126b terminated in ground stakes 124. Cables 126b may be the same as conventional cables 26 like those used in prior art system 20. In some embodiments, cables 126b are shorter than conventional cables 26 and may be, for example, about 100 meters in length.

In some embodiments, the remote transmitter 144 is configured to measure and digitize the electric potential between the ground stakes 124 into a real-time digital signal. The electric potential measured between the ground stakes 124 may be referred to herein as the "original analog signal". In some embodiments, instead of copper stakes, an existing well(s) that is connected to the remote transmitter 144 may function as the ground stakes 124. Using an existing well(s) as ground stakes 124 may provide a strong original analog signal if the existing wells are in close proximity to the downhole transmitter 34.

Figure 4:
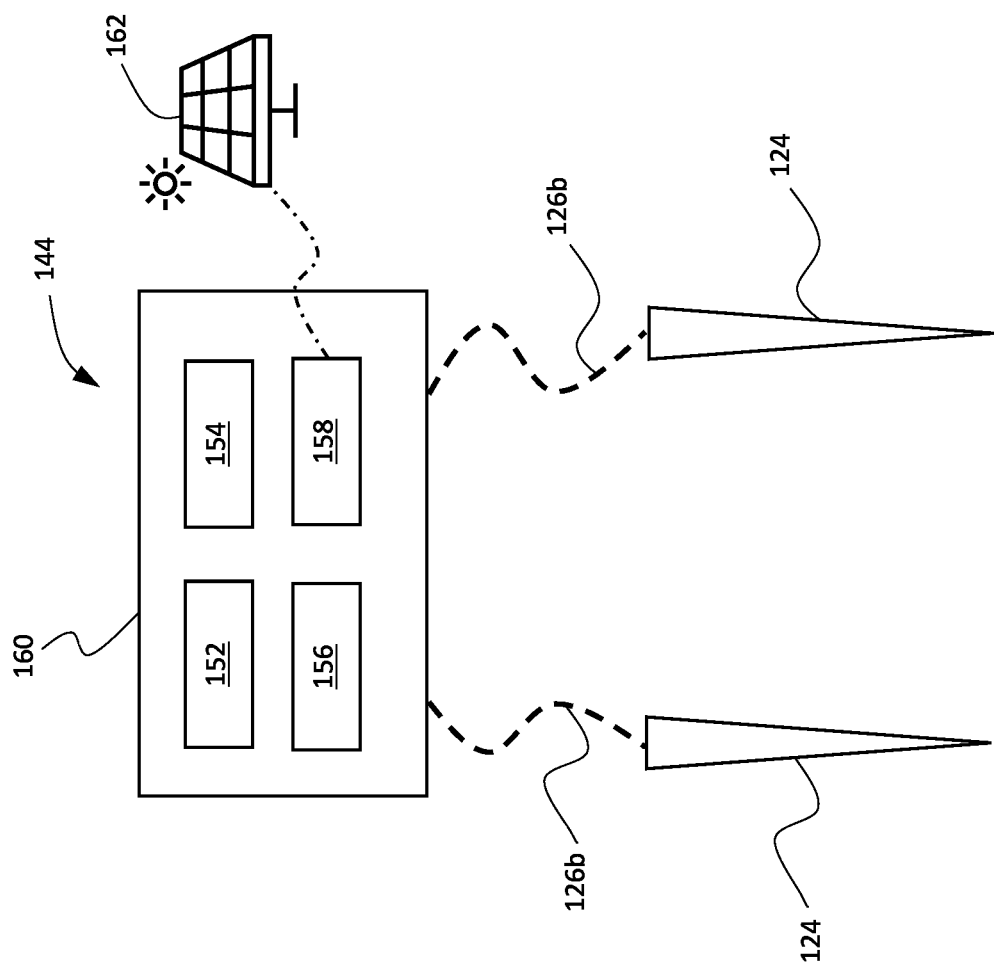
FIG. 4 is a schematic view of a remote transmitter usable in the digitizing apparatus of FIG. 2, according to one embodiment.

With reference to FIG. 4, in some embodiments, the remote transmitter 144 comprises an analog-to-digital converter 152 that operates to convert the original analog signal into a digital signal. In some embodiments, the remote transmitter 144 comprises power management hardware 154, a radio transceiver 156, and a battery 158 for supplying power to the components of the transmitter 144. In some embodiments, a solar panel 162 is used to charge the battery 158. In some embodiments, at least some of the components of the transmitter 144 are housed in a ruggedized weatherproof enclosure 160 and the transmitter 144 is configured to be portable. In some embodiments, the enclosure 160 may protect the remote transmitter 144 from the elements such as water, dust, and extreme temperatures. As a skilled person in the art can appreciate, the remote transmitter 144 may comprise a processor, a memory, software, hardware, firmware, and/or any other component that can facilitate the operation of the transmitter 144.

Referring back to FIG. 2, the remote transmitter 144 can be placed at a desired location at surface E, such as somewhere along the planned well path of the wellbore 32, at some distance D' from the remote transmitter 144 away from the rig 30. The remote transmitter 144 is configured to communicate with the local receiver 142 wirelessly, for example, by radio transmission via its radio transceiver. Being portable and free of a physical cable connection to any equipment at or near the rig 30, the remote transmitter 144, along with the ground stakes 124, may be placed almost anywhere along the planned well path with little or no restriction. In a sample embodiment, distance D' may range from about 50 meters to about 6000 meters. In another sample embodiment, distance D' may range from about 500 meters to about 4000 meters.

Figure 5:
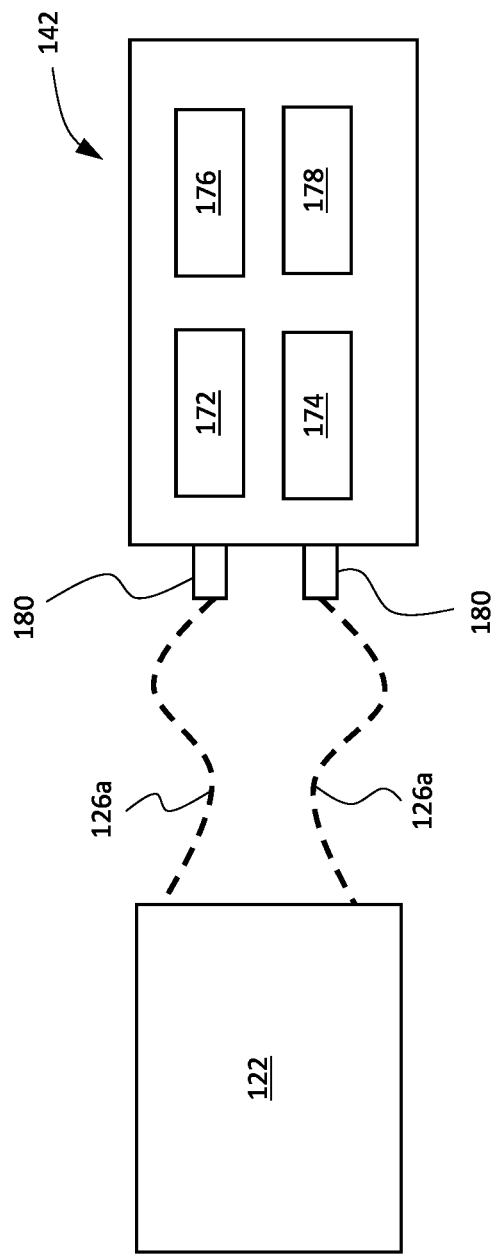
FIG. 5 is a schematic view of a local receiver usable in the digitizing apparatus of FIG. 2, according to one embodiment.

With reference to FIG. 5, in some embodiments, the local receiver 142 comprises a digital-to-analog converter 172 and a radio transceiver 176. In some embodiments, the local receiver 142 comprises one or more of: a serial port 174, a USB connection port 178, and a pair of differential analog outputs 180 for connection to surface receiver 122 via cables 126a. In some embodiments, an operator at the rig 30 may connect to the local receiver 142 by wired connection via the serial port 174 and/or the USB connection port 178 to adjust operating parameters of one or both of the local receiver 142 and the remote transmitter 144 and/or to monitor the status of the remote transmitter 144. In other embodiments, the operator may connect to the local receiver 142 by wireless connection, such as Wi-fi, cellular, etc., to adjust operating parameters of one or both of the local receiver 142 and the remote transmitter 144. In some embodiments, the local receiver 142 may include or may be connected to a human-machine interface (HMI) (not shown) to facilitate the operator's interaction with the local receiver 142. As a skilled person in the art can appreciate, the local receiver 142 may comprise a processor, a memory, software, hardware, firmware, and/or any other component that can facilitate the operation of the receiver 142.

Referring back to FIG. 2, the remote transmitter 144 operates to transmit the digital signal to the local receiver 142 by radio transmission, such as ISM-band radio transmission. When the local receiver 142 receives the digital signal by radio transmission via its radio transceiver, the digital-to-analog converter of the receiver 142 converts the digital signal back into an analog signal (the "converted analog signal") that represents the original analog signal with high fidelity. In some embodiments, the remote transmitter 144 processes the digital signal to improve the quality thereof prior to transmitting the digital signal to the local receiver 142. In additional or alternative embodiments, the local receiver 142 may process the digital signal to improve specific qualities thereof before converting the digital signal into the converted analog signal. The converted analog signal is then input into the surface receiver 122 via, for example, cables 126a. From the perspective of the surface receiver 122, the analog signal input is identical to that provided by the ground stakes via the conventional cables 26 in the prior art system 20. The surface receiver 122 can thus process the converted analog signal in the same way as the prior art surface receiver 22. In some embodiments, the local receiver 142 and the remote transmitter 144 may be configured to communicate with each other by additional or alternative means of wireless transmission, including for example cellular, satellite, etc.

Therefore, existing surface receivers 22 and ground stakes 24 can be retrofitted with the digitizing apparatus comprising the local receiver 142 and the remote transmitter 144 to eliminate the need for the lengthy conventional cables 26. Further, without the limitations imposed by the conventional cables 26, the ground stakes 124 in system 120 can be placed as far away from the rig 30 as possible to eliminate or at least reduce corruption of the original analog signal by the electrical noise generated by the drilling equipment.

Surface receiver 122 synchronizes its decoding algorithm to the input analog signal without the benefit of an explicit high-fidelity timing signal. This problem can be overcome by transmitting a header pattern in the input signal and performing an autocorrection on surface with that known pattern. Then, the resulting timing is assumed for all subsequent data signal. One drawback of this approach is that once the surface receiver 122 is synchronized, any temporal shift in the input signal will corrupt the decoding. The insertion of the digitizing apparatus in the signal path between the downhole transmitter 34 and the surface receiver 122 may introduce a temporal delay as a result of wireless communication overhead. If the temporal delay is consistent then decoding by the surface receiver 122 will not be adversely affected. A method to maintain a consistent temporal delay involves using a GPS clock in each of the remote transmitter 144 and the local receiver 142. More specifically, the remote transmitter 144 time-stamps the digital signal that corresponds to the original analog signal according to its GPS clock. Upon receiving the time-stamped digital signal from the remote transmitter 144, the local receiver 142 outputs the corresponding analog signal at a predetermined, consistent time offset to the surface receiver 122 for processing. Accordingly, the remote transmitter 144 and the local receiver 142 may be GPS time synchronized so that the phase shift between the original analog signal and the converted analog signal remains constant.

Figure 3:
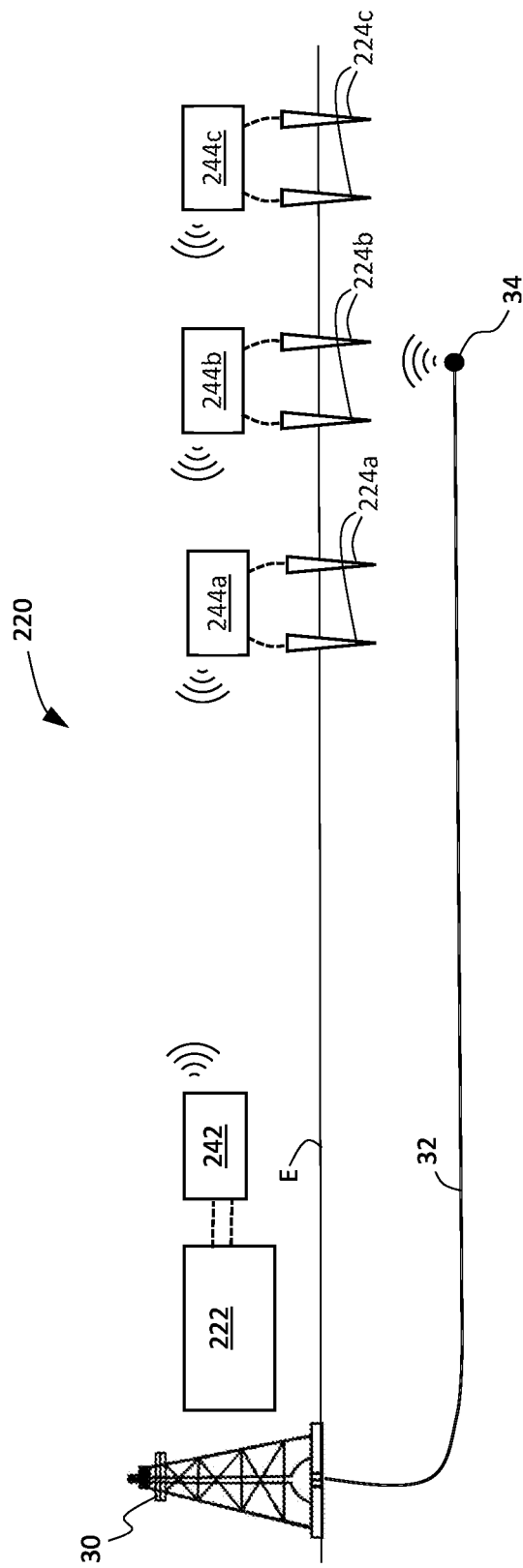
FIG. 3 is a schematic view of a system comprising a digitizing apparatus for recovering EM signals from the downhole transmitter, according to another embodiment.

With reference to FIG. 3, a system 220 according to another embodiment comprises a digitizing apparatus comprising a local synthesis receiver 242 and two or more remote digitizing transmitters 244a, 244b, 244c. In the illustrated embodiment, system 220 comprises three remote transmitters 244a, 244b, 244c, each terminated at a respective pair of ground stakes 224a, 224b, 224c via cables. It can be appreciated that system 220 may have fewer or more remote transmitters and respective pairs of ground stakes in other embodiments. In some embodiments, each of the remote transmitters 244a, 244b, 244c and its respective pair of ground stakes 224a, 224b, 224c are the same as or similar to the remote transmitter 144 and ground stakes 124, respectively, of system 120 described above with respect to FIG. 2. Each remote transmitter 244a, 244b, 244c is configured to detect an electric potential between the respective pair of grounds stakes 224a, 224b, 224c and convert a original analog signal representing the electric potential into a digital signal. Each remote transmitter 244a, 244b, 244c then transmits the digital signal to the local receiver 242 via radio transmission. In some embodiments, the pairs of ground stakes 224a, 224b, 224c are sporadically or intermittently placed along the planned well path to provide multiple measurement points for the downhole transmitter 34. As the downhole transmitter 34 moves with the drill bit (not shown) along the well path, at least one pair of the ground stakes 224a, 224b, 224c is closer to the downhole transmitter 34 than the other ground stakes at any given time. The pair of ground stakes that is the closest to the downhole transmitter 34 at a given time is likely to provide the best quality signal compared to the other ground stakes, and the corresponding remote transmitter is likely to generate the strongest digital signal at that given time. Accordingly, the strength of the digital signal of each remote transmitters 244a, 244b, 244c may indicate the proximity of the respective ground stakes 224a, 224b, 224c to the downhole transmitter 34.

In some embodiments, the local receiver 242 may be the same as or similar to the local receiver 142 of system 120 described above with respect to FIG. 2. The local receiver 242 is operably coupled to a surface receiver 222 via, for example, cables. Surface receiver 222 may be the same as or similar to surface receiver 122 described above with respect to FIG. 2. In some embodiments, the remote transmitters 244a, 244b, 244c are configured to communicate amongst themselves to determine which remote transmitter has the strongest digital signal at any given time (i.e., which pair of ground stakes 224a, 224b, or 224c is the closest to the downhole transmitter 34), and only the remote transmitter with the strongest signal transmits its digital signal to the local receiver 242. In alternative embodiments, the local receiver 242 receives the digital signals from all the remote transmitters 244a, 244b, 244c and the local receiver 242 is configured to determine which of the received digital signals is the strongest at any given time. The local receiver 242 then converts the strongest digital signal at that given time into a converted analog signal that is input into the surface receiver 222 for processing.

Unless the context clearly requires otherwise, throughout the description and the "comprise", "comprising", and the like are to be construed in an inclusive sense, as opposed to an exclusive or exhaustive sense; that is to say, in the sense of "including, but not limited to"; "connected", "coupled", or any variant thereof, means any connection or coupling, either direct or indirect, between two or more elements; the coupling or connection between the elements can be physical, logical, or a combination thereof; "herein", "above", "below", and words of similar import, when used to describe this specification, shall refer to this specification as a whole, and not to any particular portions of this specification; "or", in reference to a list of two or more items, covers all of the following interpretations of the word: any of the items in the list, all of the items in the list, and any combination of the items in the list; the singular forms "a", "an", and "the" also include the meaning of any appropriate plural forms.

Where a component is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the full scope consistent with the claims. All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples but should be given the broadest interpretation consistent with the description as a whole.

What is claimed is:

1. A method comprising:
    installing a plurality of pairs of ground stakes in the earth, with each pair of the plurality of pairs of ground stakes at a respective distance from a local receiver located at or near a drilling rig;
    measuring, by a first remote transmitter, an electric potential between a first pair of the plurality of pairs of ground stakes, the electric potential between the first pair providing a first analog signal;
    converting, by the first remote transmitter, the first analog signal into a first digital signal that represents the electric potential between the first pair, the first digital signal having a first signal strength;
    measuring, by a second remote transmitter, an electric potential between a second pair of the plurality of pairs of ground stakes, the second pair being spaced apart from the first pair, the electric potential between the second pair providing a second analog signal;
    converting, by the second remote transmitter, the second analog signal into a second digital signal that represents the electric potential between the second pair, the second digital signal having a second signal strength; and
    one of:
    (a) comparing, by the first and second remote transmitters, the first and second signal strengths to determine which of the first and second signal strengths is greater; and if the first signal strength is greater, transmitting, by the first remote transmitter, the first digital signal wirelessly to the local receiver; or if the second signal strength is greater, transmitting, by the second remote transmitter, the second digital signal wirelessly to the local receiver; and
    (b) transmitting, by the first and second remote transmitters, the first and second digital signals wirelessly to the local receiver; and comparing, by the local receiver, the first and second signal strengths to determine which of the first and second signal strengths is greater.

2. The method of claim 1 wherein the comparing is performed by the first and second remote transmitters, and the method comprises:
    converting, by the local receiver, the first or second digital signal into a third analog signal; and
    transmitting, by the local receiver, the third analog signal to a surface receiver located at or near the drilling rig.

3. The method of claim 1 wherein the comparing is performed by the local receiver, and the method comprises:
    one of: (i) if the first signal strength is greater, converting, by the local receiver, the first digital signal into a third analog signal; and (ii) if the second signal strength is greater, converting, by the local receiver, the second digital signal into the third analog signal; and
    transmitting, by the local receiver, the third analog signal to a surface receiver located at or near the drilling rig.

4. The method of claim 1 wherein the respective distance ranges from 50 meters to 6000 meters.

5. The method of claim 1 wherein installing the plurality of pairs of ground stakes comprises positioning at least one pair of the plurality of pairs of ground stakes along a planned well path of a wellbore.

* * * * *